US008805908B2

United States Patent
Maekawa et al.

(10) Patent No.: US 8,805,908 B2
(45) Date of Patent: Aug. 12, 2014

(54) APPROXIMATION PROCESSING METHOD AND APPROXIMATION PROCESSING DEVICE

(75) Inventors: Takashi Maekawa, Kanagawa (JP); Yuu Nishiyama, Tokyo (JP); Masayuki Morioka, Tokyo (JP)

(73) Assignee: National University Corporation Yokohama National University, Yokohama-shi, Kanagawa (JP)

( * ) Notice: Subject to any disclaimer, the term of this patent is extended or adjusted under 35 U.S.C. 154(b) by 749 days.

(21) Appl. No.: 12/994,011

(22) PCT Filed: Feb. 24, 2009

(86) PCT No.: PCT/JP2009/053252
§ 371 (c)(1),
(2), (4) Date: Nov. 22, 2010

(87) PCT Pub. No.: WO2009/142037
PCT Pub. Date: Nov. 26, 2009

(65) Prior Publication Data
US 2011/0078223 A1 Mar. 31, 2011

(30) Foreign Application Priority Data

May 23, 2008 (JP) ................................. 2008-135643

(51) Int. Cl.
*G06F 1/02* (2006.01)
*G06F 7/38* (2006.01)
(52) U.S. Cl.
USPC ......................................... 708/270; 708/290
(58) Field of Classification Search
USPC ......................................... 708/270, 290, 313
See application file for complete search history.

(56) References Cited

U.S. PATENT DOCUMENTS 5,991,703 A * 11/1999 Kase .............................. 702/167
6,084,586 A * 7/2000 Ooka et al. .................... 345/419
(Continued)

FOREIGN PATENT DOCUMENTS

JP 4-117572 A 4/1992
JP 04-117572 A 4/1992
WO 2007/083602 A1 7/2007

OTHER PUBLICATIONS

Japanese Office Action dated Apr. 5, 2013, issued in corresponding Japanese Patent Application No. 2010-512954, with English translation (6 pages).

(Continued)

Primary Examiner — Chuong D Ngo
(74) Attorney, Agent, or Firm — Westerman, Hattori, Daniels & Adrian, LLP

(57) ABSTRACT

An approximation processing method for approximating a point group using a curve or a surface defined by control points includes a step of forming an approximated curve (surface) using control points that retain features of a shape; a first calculation step of calculating a closest point closest to each of the data points on the approximated curve (surface); a second calculation step of calculating an error vector that joins the closest point, obtained in the first calculation step, to the data point; and a third calculation step of calculating a corrected control point by moving each of the control points based on the error vector obtained by the second calculation step. The step of forming an approximated curve (surface) and the first to third calculation steps are repeated to make the approximated curve (surface) respectively approximate the curve (surface) of an object configured by the data points. In correcting control points, a simple geometrical algorithm is used for calculating control points to reduce the number of control point convergence operations and thereby to quickly generate a curve or a surface, which approximates the data points of a point group, without having to solve a linear system.

13 Claims, 15 Drawing Sheets

(56) References Cited

U.S. PATENT DOCUMENTS

| | | |
|---|---|---|
| 8,228,329 B2 | 7/2012 | Maekawa et al. |
| 2007/0052974 A1* | 3/2007 | Tubic et al. .................. 356/604 |
| 2009/0027398 A1* | 1/2009 | Frisken ......................... 345/442 |

OTHER PUBLICATIONS

Catmull, E and Clark, J. "Recursively Generated B-spline Surfaces on Arbitrary Topological Meshes," Computer Aided Design, Nov. 1978, vol. 10, No. 6, cited in spec.

Chaikin, George Merrill "Short Note: An Algorithm for High-Speed Curve Generation," Computer Graphics and Image Processing, 1974, vol. 3, pp. 346-349, cited in spec.

Cheng, Kin-Shing D. et al "Design and Analysis of Optimization Methods for Subdivision Surface Fitting," IEEE Transactions of Visualization and Computer Graphics, Sep./Oct. 2007, vol. 13, No. 5, pp. 878-890, cited in spec.

Doo, D. and Sabin, M. "Behaviour of Recursive Division Surfaces Near Extraordinary Points," Computer Aided Design, Nov. 1978, vol. 10, Issue 6, pp. 356-360, cited in spec.

Marinov, Martin and Kobbelt, Leif "Optimization Methods for Scattered Data Approximation with Subdivision Surfaces," Graphical Models, Sep. 2005, vol. 67, Issue 5, pp. 452-473, cited in spec.

Halstead, Mark et al "Efficient, Fair Interpolation Using Catmull-Clark Surfaces," SIGGRAPH '93 Proceedings of the 20th annual conference on Computer graphics and interactive techniques, 1993, cited in spec.

Hongwei, Lin et al "Constructing Iterative Non-Uniform B-spline Curve and Surface to Fit Data Points," Science in China Series F: Information Sciences, May 2004, vol. 47, No. 3, pp. 315-331, cited in spec.

Loop, Charles Teorell, "Smooth Subdivision Surfaces Based on Triangles," M.A. thesis, University of Utah, Aug. 1987, cited in spec.

International Search Report of PCT/JP2009/053252, mailing date Apr. 21, 2009.

English Translation of Written Opinion of PCT/JP2009/053252, mailing date Apr. 21, 2009.

Catmull, E and Clark, J. "Recursively Generated B-spline Surfaces on Arbitrary Topological Meshes," Computer Aided Design, Nov. 1978, vol. 10, No. 6.

Chaikin, George Merrill "Short Note: An Algorithm for High-Speed Curve Generation," Computer Graphics and Image Processing, 1974, vol. 3, pp. 346-349.

Cheng, Kin-Shing D. et al "Design and Analysis of Optimization Methods for Subdivision Surface Fitting," IEEE Transactions of Visualization and Computer Graphics, Sep./Oct. 2007, vol. 13, No. 5, pp. 878-890.

Doo, D. and Sabin, M. "Behaviour of Recursive Division Surfaces Near Extraordinary Points," Computer Aided Design, Nov. 1978, vol. 10, Issue 6, pp. 356-360.

Marinov, Martin and Kobbelt, Leif "Optimization Methods for Scattered Data Approximation with Subdivision Surfaces," Graphical Models, Sep. 2005, vol. 67, Issue 5, pp. 452-473.

Garland, Michael and Heckbert, Paul S. "Surface Simplification Using Quadric Error Metrics," SIGGRAPH 97, 1997.

Halstead, Mark et al "Efficient, Fair Interpolation Using Catmull-Clark Surfaces," SIGGRAPH '93 Proceedings of the 20th annual conference on Computer graphics and interactive techniques, 1993.

Hongwei, Lin et al "Constructing Iterative Non-Uniform B-spline Curve and Surface to Fit Data Points," Science in China Series F: Information Sciences, May 2004, vol. 47, No. 3, pp. 315-331.

Hoppe, Hugues et al "Piecewise Smooth Surface Reconstruction," SIGGRAPH '94 Proceedings of the 21st annual conference on Computer graphics and interactive techniques, 1994.

Loop, Charles Teorell, "Smooth Subdivision Surfaces Based on Triangles," M.A. thesis, University of Utah, Aug. 1987.

* cited by examiner

Point group p

Triangular mesh

Control point P $S^{(k)}$   $M^n$

FIG. 12(a)
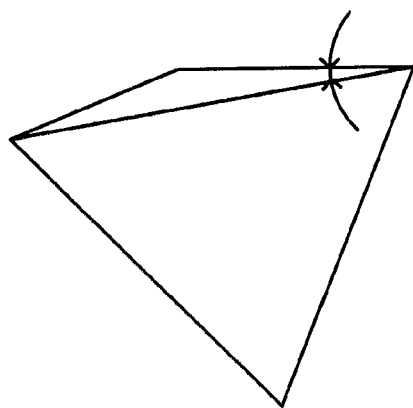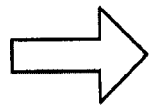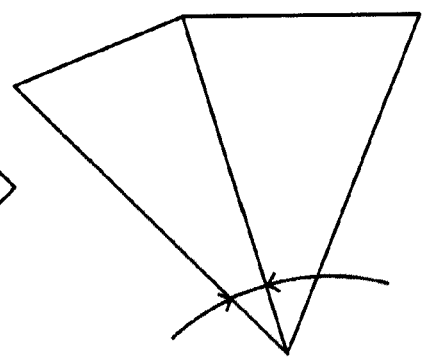
FIG. 12(b)

APPROXIMATION PROCESSING METHOD AND APPROXIMATION PROCESSING DEVICE

TECHNICAL FIELD

The present invention relates to an approximation processing method and an approximation processing device for generating a curve or a surface by approximating point group data.

BACKGROUND ART

A free-form surface, which is used for the body of various industrial products such as a ship, a car, and an airplane, combines functionality with beauty, and is used for the design engineering of home electrical appliances and many other consumer products that require good form.

Recently, a 3D laser scanner collects high-density point group data speedily and easily, allowing an object shape to be measured accurately. For example, in the field of 3D modeling, a mock-up model manually created by a designer is measured by a 3D laser scanner to create CAD data, such as surface data necessary for producing products, based on the point group data and polygon data captured by a computer. This is the so-called the reverse engineering technique.

In general, a 3D model is represented on a computer using a polygon model or surface patches such as NURBS and B-Spline.

This polygon model, though efficient for performing shape processing such as a phase change, has a problem that a smooth surface cannot be represented because the polygon model is composed of flat surfaces. Another problem with the polygon model is that the more detailed the shape to be represented is, the larger the amount of data becomes.

A surface patch allows a smooth surface to be represented with a smaller number of control parameters, but the problem is that the patch shape is limited to squares and that it is difficult to ensure continuity between patches. To solve those problems, the subdivision method that combines the advantages of a polygon model with the advantages of a surface patch has attracted attention as a method efficient for the modeling of a free geometrical shape and, today, this method is already used commonly in the animation field.

The subdivision method refers to a method that divides the initial polygon mesh repeatedly and regularly to smooth its shape and, eventually, to produce a smooth surface. A surface created by the division is called a subdivision surface, and the final surface as a limit surface. Because of the characteristics that allow a smooth surface to be generated easily even for a model having any phase and because of the ability to define a smooth surface in any part, the subdivision method is now used in many fields such as modeling.

In the reverse engineering field, several methods have conventionally been proposed in which measured point group data is approximated to generate a surface by using the subdivision surface, B-Spline, NURBS, etc. In the conventional method for approximating or interpolating the data points of a point group, the operation processing is performed for serially obtaining the control points so that the distance error between the initial control point, obtained from the data points, and the generated surface is minimized. The operation for obtaining the control points is carried out by solving the linear determinant represented by AP=S where S is the column of the point group, P is the column of the control points for generating a surface approximating the point group, and A is the basis function matrix for defining the surface.

As one of the conventionally proposed approximation methods, the interpolation method for the Catmull-Clark subdivision surface for a polyhedron mesh, proposed by Halsted and his colleagues, is known (Non-Patent Document 1). This method requires the solution of not only a large-scale linear system but also a minimization problem for surface correction called fairing, resulting in a very high calculation cost.

Hoppe and his colleagues propose a method in which the approximation method of the loop subdivision surface for the data points of a point group is processed as a least-squares problem that, with a subdivided polygon mesh as a linearly-approximated subdivision surface, parameters are generated by orthogonally projecting from the points onto the surface and the distance between each point and the point on the linearly-approximated subdivision surface corresponding to the point is minimized (Non-Patent Document 2).

The method proposed by Hoppe and his colleagues (Non-Patent Document 2) generates parameters on the linearly approximated surface while Marinov and Kobbelt generate parameters on the limit surface using Stam's theory. However, the calculation of the control points requires a long time because a large-scale linear system must be solved (Non-Patent Document 8).

The method for fitting a loop subdivision surface to a point group using the SDM method (Squared Distance Minimization) is proposed. In this method, the object function, generated by locally quadratic-approximating a squared distance function from the initial surface is serially changed to transform the surface into a target surface. This method also solves a linear system and so requires a long time for the calculation (Non-Patent Document 9).

The method using the relation between a point group, specified for interpolating a B-Spline curve/surface, and the knot of the curve/surface generated by the point group is proposed. In this method, the distance between the given point group and the knot is used as a motion vector, the control point is moved for the length corresponding to the vector, and this processing is repeated until the distance between the point and the knot becomes 0. However, because double control points are used at both ends, this method cannot be used for CAD data. In some cases, a swell may be generated because the difference vector with the knot is used (Non-Patent Document 10).

Non-Patent Document 1: M. Halsted, M. Kass and T. DeRose. Efficient, fair interpolation using Catmull-Clark surfaces. In Eugene Fiume, editor. Proceedings of SIGGRAPH1993, pages 47-61. ACM, ACM Press/ACM SIGGRAPH, 1993

Non-Patent Document 2: H. Hoppe, T. DeRose, T. Duchamp and M. Halsted. Piecewise smooth surface reconstruction. In Proceedings of SIGGRAPH 1994, pages 47-61. ACM, ACM Press/ACM SIGGRAPH, 1994

Non-Patent Document 3: M. Garland and P. S. Heckbert. Surface simplification using quadric error metrics. In Proceedings of ACM SIGGRAPH 97, 209-216.

Non-Patent Document 4: C. T. Loop. Smooth subdivision surface based on triangle. Masters thesis, Department of Mathematics. University of Utha.1987/.

Non-Patent Document 5: E. Catmull and J. Clark. Recursively generated b-spline surfaces on arbitrary topological meshes. Computer-Aided Design, 10(6):350-355, 1987.

Non-Patent Document 6: D. Doo and M. Sabin. Behavior of recursive division surfaces near extraordinary points. Computer-Aided Design, 10(6):356-360, 1978.

Non-Patent Document 7: G. M. Chaikin. An algorithm for high-speed curve generation. Computer Graphics and Image Processing, 3:346-349, 1974.

Non-Patent Document 8: M. Marinov and L. Kobbelt, Optimization methods for scattered data approximation with subdivision surface, Graphical Models 67, 2005, 452-473.

Non-Patent Document 9: K-S. D. Cheng, Wang. W, Qin. H, K-Y. K. Wong, Yang. H and Liu. Yang. 2007. Design and analysis of optimization methods for subdivision surface fitting. IEEE Transaction on Visualization and Computer Graphics 13, 5, 878-890.

Non-Patent Document 10: Lin. H, Wang. G, and Dong. C. 2003. Constructing iterative non-uniform B-spline curve and surface to fit data points. Science in China 33, 912-923.

DISCLOSURE OF THE INVENTION

Problems to be Solved by the Invention

Among the above-described conventional methods for approximating the data points of a point group with the use of a subdivision surface, B-Spline, NURBS, etc., a method for obtaining a solution of a linear system, in which the approximation or interpolation operation is solved by a determinant, requires more operations as more data points of the point group and more control points are used because of the property of the linear system operation. In general, because many point groups and many control points formed by the point groups are used in 3D modeling, the operation for generating a surface from a point group results in an operation for solving a large-scale linear system and, so, the problem is that the operation requires a very long calculation time.

In addition, the creation of a smooth surface requires that the operation processing for solving a large-scale linear system be repeated until the distance error between the initial control point and the created surface is minimized. This also requires a very long time to create a desired smooth surface.

Therefore, it is an object of the present invention to solve the prior-art problems described above, to reduce the operation time required for generating a curve or a surface that approximates the data points of a point group, and to provide a method and a device for generating a curve or a surface that approximates a point group without solving a linear system.

Means to Solve the Problems

In the approximation processing for approximating the shape of the data points of a point group using a curve or a surface, the present invention selects the feature points, which retain the feature of the shape, from a broken line or a mesh formed by the data points of the point group for use as the control points and, by using the control points, approximates the curve or the surface. In sequentially correcting the control points to increase the degree of approximation, the present invention calculates the corrected control points using a simple geometrical algorithm that allows approximation to be performed quickly without requiring a long calculation time for solving a linear system.

The interpolation method and the approximation method are known for fitting data points with the use of control points, but they differ in that the interpolation method fits the data points of a point group using the number of control points equal to the number of data points but the approximation method fits the data points of a point group using the number of control points fewer than the number of data points.

QEM (Surface simplification using quadric error metrics: Non-Patent Document 3) may be used as a method for selecting control points from the data points of a point group while retaining the shape.

With the data points of a point group as the initial data, the present invention obtains control points from the data points by performing the QEM processing and sequentially corrects the control points by the calculation steps. In addition, if the data points of the point group and the control points selected from the data points are known, the known control points may be sequentially corrected by the calculation steps. If the control points are known, the processing of selecting control points from the data points of the point group may be omitted.

To move a control point, the present invention calculates the closest point on the curve or the surface that is closest to each data point of the given point group by means the Newton method, obtains an error vector that joins the calculated closest point to each data point and, using this error vector, successively moves the control point for better approximation. The present invention moves control points through geometrical algorithm processing without having to solve a linear system, thus speeding the processing.

The method of the present invention, which processes control points through geometrical algorithm processing, does not require a linear system and allows an approximated curve or an approximated surface to be generated only by the geometrical process. Therefore, the method of the present invention performs the processing faster than the conventional method.

The present invention, applicable not only to the three dimension but also to the two dimension, is applicable to the generation of a subdivision surface that approximates the data points of a point group in three dimension as well as to the generation of a curve that approximates the data points of a point group in two dimension.

The present invention may be embodied as a method and a device for the approximation processing. An approximation processing device comprises means for performing the approximation processing method by software or hardware.

An approximation processing method of the present invention for approximating the data points of a point group using a curve or a surface defined by control points comprises a step of forming an approximated curve or an approximated surface using control points that retain features of a shape; and a calculation step of calculating the correction position of the control points.

The calculation step of calculating the correction positions of the control points includes a first calculation step of calculating a closest point closest to each of the data points on the approximated curve or the approximated surface; a second calculation step of calculating an error vector that joins the closest point, obtained in the first calculation step, to the data point; and a third calculation step of calculating a corrected control point by moving each of the control points based on the error vector obtained by the second calculation step.

The step of forming an approximated curve or an approximated surface and the calculation steps may be performed by operation means in which a geometrical algorithm is included. The step of forming an approximated curve or an approximated surface and the first to third calculation steps are repeated by the geometrical algorithm to make the approximated curve or the approximated surface respectively approximate the curve or the surface configured by the data points of an object.

The data points of the point group used for the approximation processing of the present invention may be obtained, for example, by a three-dimensional shape measuring apparatus.

The initial control points may be obtained by forming a broken line or a mesh, created by joining the data points of the given point group, and by selecting the points, which retain the feature of the shape, from the broken line or the mesh through the QEM processing. With those points as the initial control points, the positions of the control points are corrected by the first to third calculation steps.

The calculation steps for calculating the corrected positions of the control points, which is simple geometrical processing, eliminates the need for solving a linear system required in the conventional method.

The first calculation step uses the Newton method to calculate the closest point closest to the data point on the approximated curve or the approximated surface.

The second calculation step is a step of calculating, for each of all data points of the point group, the error vector that joins the data point to the closest point.

The third calculation step is a step of calculating the corrected control points by moving each of the control points based on the error vector calculated by the second calculation step, performs weighting processing for error vectors that are a plurality of error vectors calculated by the second calculation step and that are calculated for closest points around a control point to be corrected, adds up the weighted error vectors through vector addition, moves a control point to be corrected using the added vector, generated by adding up the vectors, as a motion vector, and calculates the moved control point as the corrected control point.

The error vector used for moving a control point is obtained by adding up, through vector addition, the error vectors calculated at the closest points around the control point in the second calculation step. The error vectors are weighted during the vector addition to reduce the number of operations required until the control point converges.

The weighting processing in the third calculation step is performed by the operation processing in which each of the error vectors is multiplied by a factor. This factor, which is determined according to a distance between the control point and the closest point, is determined in such a way that the closer the closest point is to the control point, the larger the value is and the farther the closest point is from the control point, the smaller the value is. Because a closest point closer to the control point is assumed to have a relation closer to the control point, weighting the error vector of a closest point closer to the control point more heavily reduces the number of operations required until the control point converges.

The weighting factor is determined according to the barycentric coordinate.

The approximation processing of the present invention calculates an approximation error of the approximated curve or the approximated surface based on a distance between the data point and the closest point corresponding to the data point and repeats the control point calculation processing until the calculated approximation error becomes smaller than a predetermined value.

In forming the approximated surface, if the approximation error does not become smaller than the predetermined value even after the approximation processing, in which the control point is moved, is repeated the specified number of times, the face division of the mesh formed by the control points is performed to increase the number of control points or the mesh formed by the control points is locally re-meshed. The control point calculation step, the control point increase step through the face division, and local re-meshing are repeated until the approximation error becomes smaller than a predetermined value.

In forming the approximated curve, if the approximation error does not become smaller than the predetermined value even after the approximation processing, in which the control point is moved, is repeated the specified number of times, knots are inserted to increase the number of control points. The control point calculation step and the control point increase step are repeated until the approximation error becomes smaller than a predetermined value.

An approximation processing device of the present invention is an approximation processing device for approximating the data points of a point group using a curve or a surface defined by control points, and the approximation processing device comprises operation means that performs a step of forming an approximated curve or an approximated surface using control points that retain features of a shape; a first calculation step of calculating a closest point closest to each of the data points on the approximated curve or the approximated surface; a second calculation step of calculating an error vector that joins the closest point, obtained in the first calculation step, to the data point; and a third calculation step of calculating a corrected control point by moving each of the control points based on the error vector obtained by the second calculation step.

The operation means comprises either a CPU and a storage device for executing a geometrical algorithm for performing the step of forming an approximated curve or an approximated surface and the calculation steps by software or a circuit for executing the geometrical algorithm by hardware. The operation means performs the step of forming an approximated curve or an approximated surface and the first to third calculation steps repeatedly to make the approximated curve or the approximated surface respectively approximate the curve or the surface configured by the data points of an object.

The surface is defined by control points determined by the Loop subdivision (Non-Patent Document 4), B-spline, or NURBS using a triangular mesh or determined by the subdivision such as the Catmull-Clark subdivision (non-Patent Document 5) or Doo-Sabin subdivision (Non-Patent Document6) using a square mesh.

The curve may be defined by the control points determined by the B-Spline curve or Chaikin subdivision (Non-Patent Document 7). The Chaikin subdivision converges to a quadratic B-Spline curve and, in general, approximation may be performed for an n-ary B-Spline curve.

Effects of the Invention

As described above, the present invention reduces the operation time required for generating a curve or a surface that approximates the data points of a point group.

The present invention generates a curve or a surface, which approximates the data points of a point group, without having to solve a linear system.

BRIEF DESCRIPTION OF THE DRAWINGS

FIG. 12 is a diagram showing an example of local re-meshing.

DESCRIPTION OF REFERENCE NUMERALS

Figure 1:
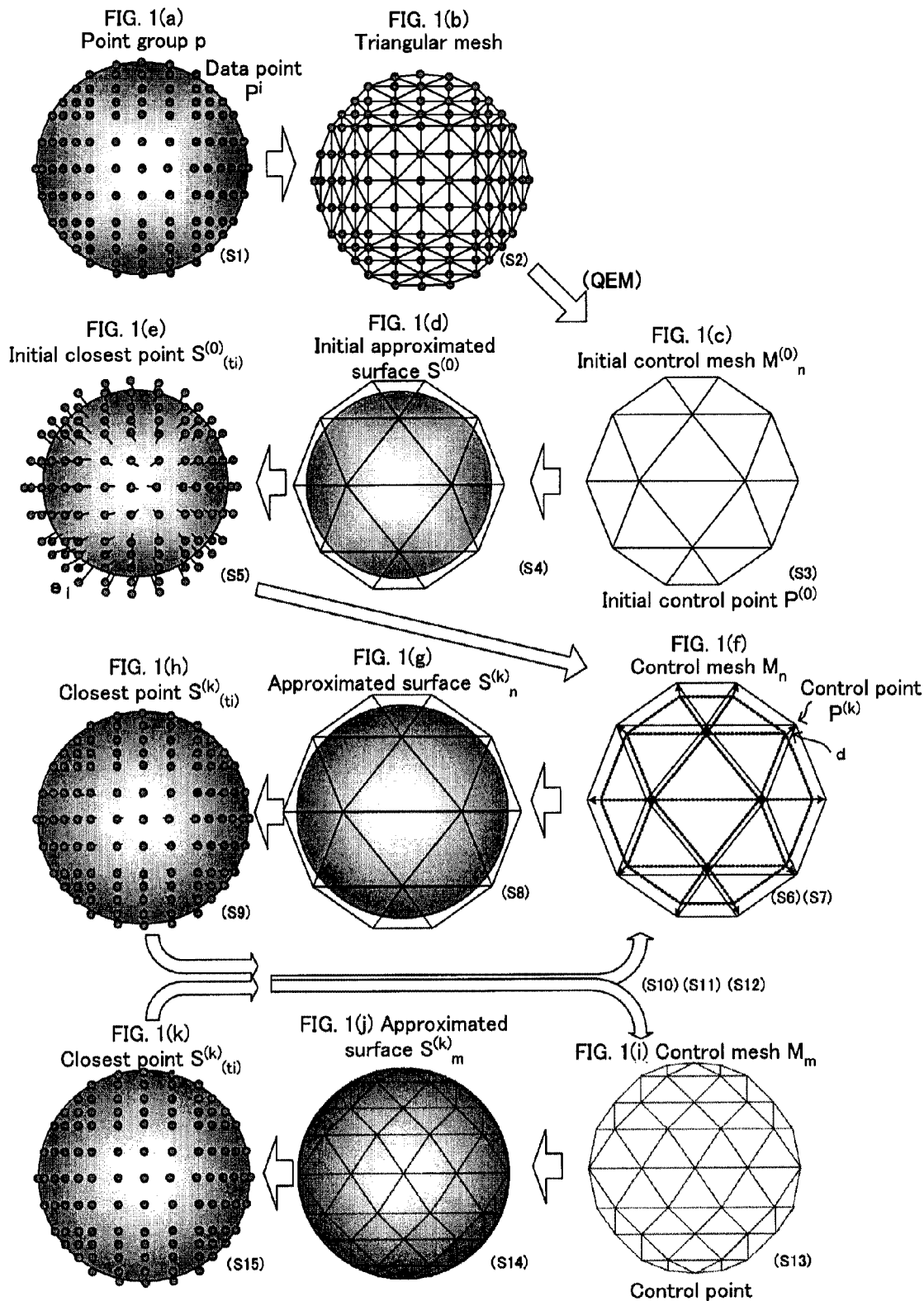
FIG. 1 is a general diagram showing the outline of the approximation processing of the present invention.

1 . . . Input means
2 . . . Storage means
2a . . . Data storage unit
2b . . . Operation tool program storage unit
2c . . . Operation program processing program storage unit
2d . . . Temporary storage unit
2e . . . Operation result storage unit
3 . . . Operation means
4 . . . Display means
5 . . . Output means

BEST MODE FOR CARRYING OUT THE INVENTION

An embodiment of the present invention will be described in detail below with reference to the drawings.

Figure 2:
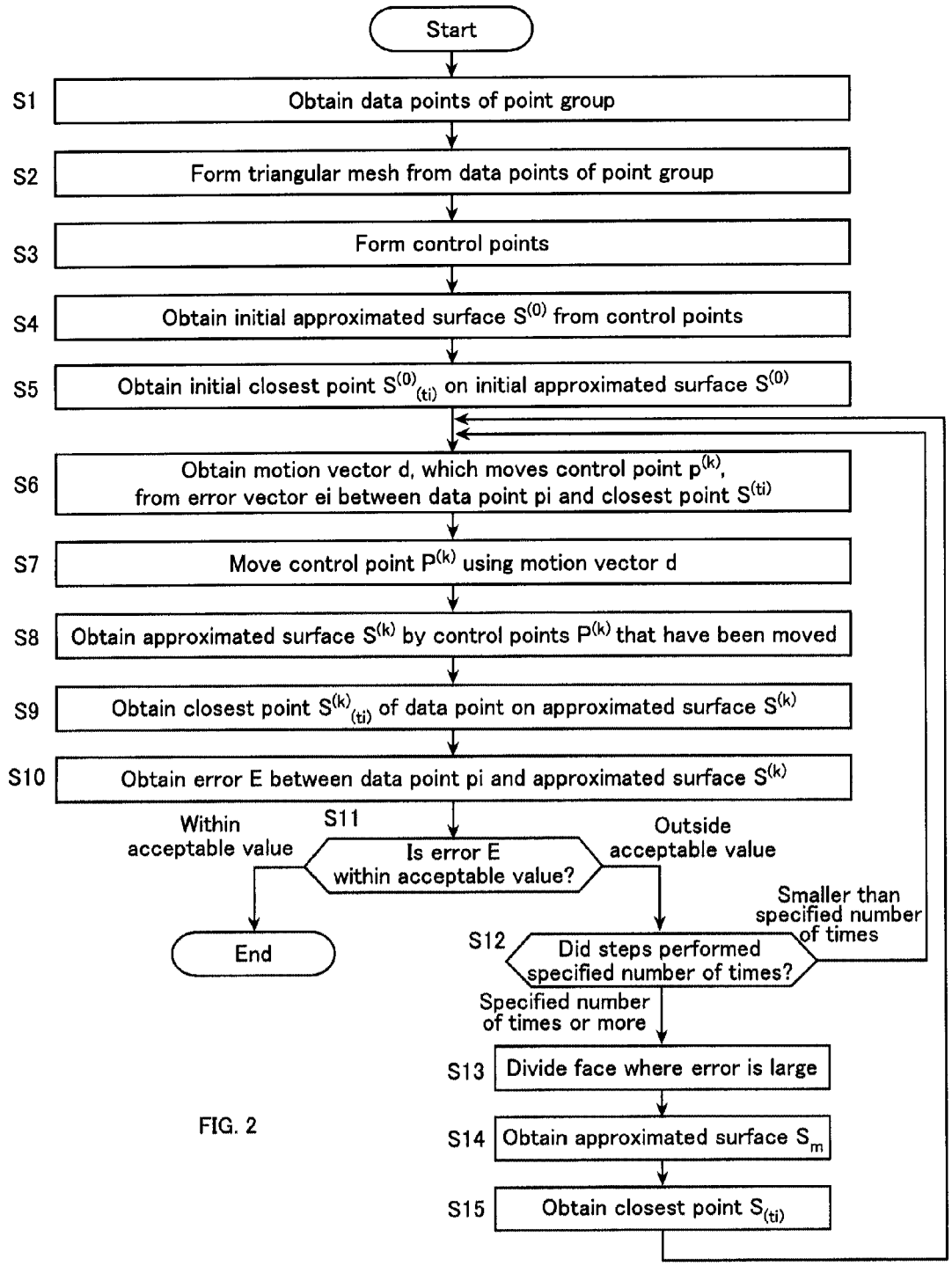
FIG. 2 is a flowchart showing the outline of the approximation processing of the present invention.
Figure 3:
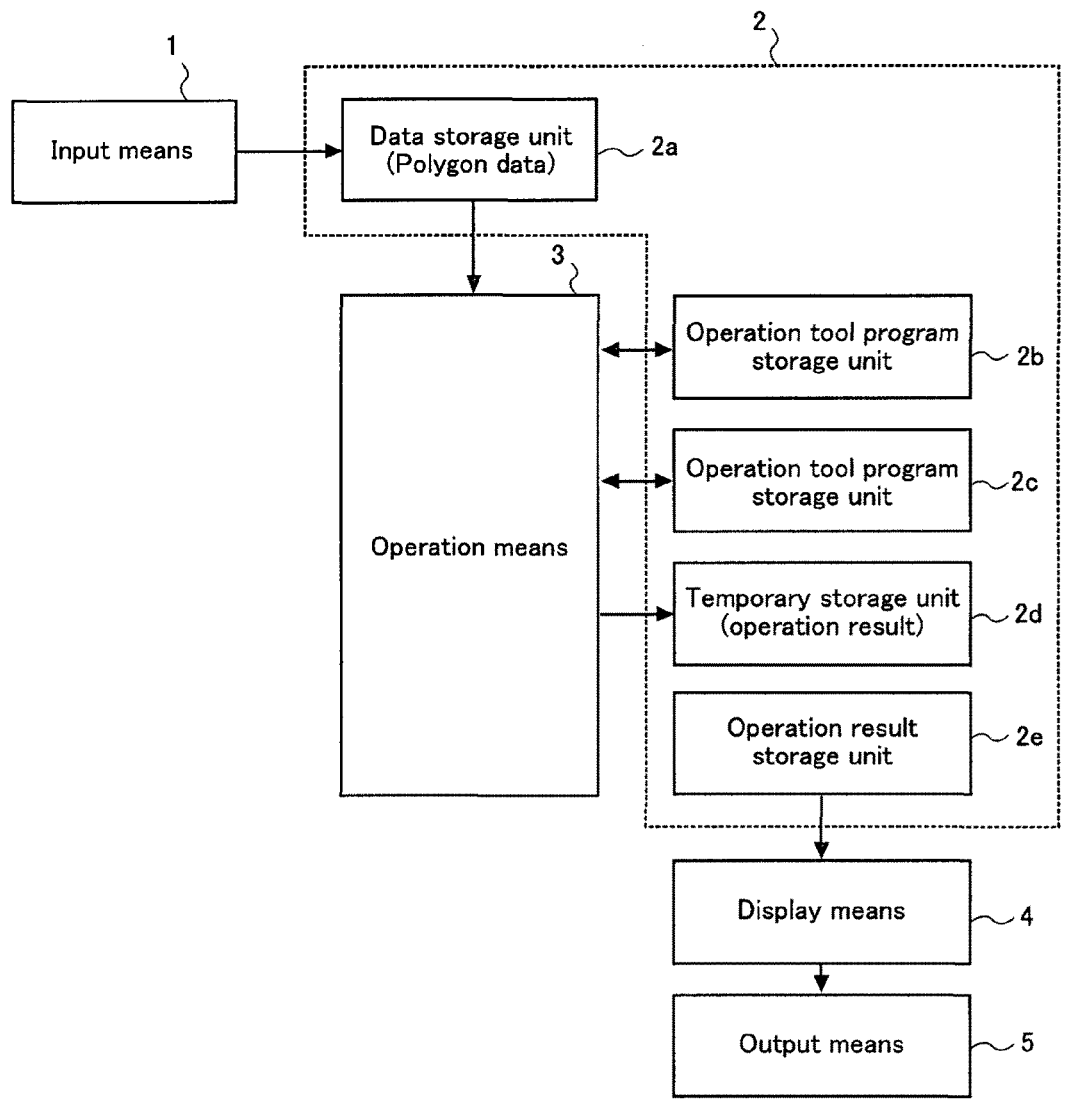
FIG. 3 is a general configuration diagram showing an approximation processing device of the present invention.

FIG. 1 is a diagram showing the outline of the approximation processing of the present invention, FIG. 2 is a flowchart showing the outline of the approximation processing of the present invention, and FIG. 3 is a diagram showing the general configuration of an approximation processing device of the present invention.

FIG. 1 and FIG. 2 generally show the procedure for obtaining an approximated surface $S^\infty$ from the data points $p_i$ of the point group P. The figures show the procedure for obtaining the high-density, irregular data points $p_i$ of the point group P obtained by a 3D laser scanner (3D shape measuring apparatus), for obtaining the control points, which represent the features of the shape, from the mesh formed by the data points $p_i$ of this point group P by means of the method such as QEM, and for generating the final approximated surface $S^\infty$ from the control points.

If the data points of the point group and the control points selected from the data points are known, the figures may also be applied to the procedure for generating an approximated surface $S^\infty$ by sequentially making correction with the use of the known control points.

Although the procedure is described below with focus on a surface, a curve may also be generated in the same way. The flowchart described below shows the procedure that begins with the step for measuring data points.

First, an object is measured by a 3D measuring apparatus, such as a 3D laser scanner, to obtain the data points $p_i$ of the point group p (FIG. 1(a)) (S1). The data points $p_i$ of the point group p, obtained by the measurement, are joined to create a mesh. The figure shows an example of a triangular mesh (FIG. 1(b)) (S2).

The triangular mesh, formed by data points $p_i$, is simplified to generate control points while retaining the shape features of the original object. A control mesh is formed by the control points. The mesh may be a triangular mesh or a square mesh. The simplification processing of the mesh that retains the features may be performed using an existing method such as QEM.

The mesh formed by the initial control points $p^{(0)}$ is the initial control mesh $M^{(0)}_n$, and each of the subsequent meshes formed by changing the control points to the next control points is the control mesh $M_n$. Note that the subscript 0 represents the initial stage, and n represents the number of control points (FIG. 1(c)) (S3).

The initial approximated surface $S^{(0)}$ is generated using the control points $P^{(0)}$ of the initial control mesh $M^{(0)}_n$ (FIG. 1(d)) (S4). The initial closest point $S^{(0)}(t_i)$ corresponding to each data point $p_i$ of the point group p is obtained on the initial approximated surface $S^{(0)}$ generated in S4 (S5).

The error vector $e_i$ from this initial closest point $S^{(0)}(t_i)$ to the data point $p_i$ is obtained (FIG. 1(e)), and the motion vector d, which moves the position of the initial control point $P^{(0)}$, is obtained using the error vector $e_i$ present around the initial control point $P^{(0)}$. If multiple error vectors $e_i$ are present around the initial control point $P^{(0)}$, those multiple error vectors $e_i$ are added up to obtain the motion vector d (S6).

The position of the initial control point $P^{(0)}$ is moved, using the obtained motion vector d, to create the control point $P^{(k)}$ whose position has been corrected (S7).

In the next processing, the error vector $e_i$ from the closest point $S^{(k)}(t_i)$ to the data point $p_i$ is obtained (FIG. 1(e)), and the motion vector d, which moves the position of the control point $P^{(k)}$, is obtained using the error vector $e_i$ present around the control point $P^{(k)}$ (if multiple error vectors $e_i$ are present, those multiple error vectors $e_i$ are added up) (S6). The position of the control point $P^{(k)}$ is moved, using the obtained motion vector d, to create the control point $P^{(k+1)}$ whose position has been corrected (FIG. 1(f)) (S7).

The subscript (k) of the control point $P^{(k)}$ represents the number of repetitions, and the control point generated by the (k)th step is represented by $P^{(k)}$. The initial control point $P^{(0)}$ is represented by writing the subscript (0) as the superscript, and the subscript (k) of the control point $P^{(k)}$, obtained by the subsequent repetition, is increased by "1" for each repetition to represent the number of repetitions with the numeric value of "k" of the subscript (k).

The approximated surface $S^{(k)}$ is generated using the control points $P^{(k)}$ obtained by the movement by the motion vector d (FIG. 1(g)) (S8). The closest point $S^{(k)}(t_i)$ corresponding to each data point $p_i$ of the point group p is obtained on the approximated surface $S^{(k)}$ generated in S8 (S9).

By repeating the steps S6-S9 described above, the control points $P^{(k)}$ are sequentially moved and their positions are corrected to make the approximated surface $S^{(k)}$ approximate to the shape of the object.

Whether or not the approximated surface $S^{(k)}$ approximates to the shape of the object is evaluated in steps S10-S11 that follow. If the degree of approximation of the approximated surface $S^{(k)}$ does not satisfy the predetermined acceptable value, either steps S6-S9 are repeated to move the control points or steps S13-S15 are performed to divide the mesh to increase the number of control points.

To evaluate if the approximated surface $S^{(k)}$ approximates the shape of the object, the error E is obtained from the absolute value error between the closest point $S^{(k)}(t_i)$ and the data point $p_i$ (S10) and the obtained error E is compared with the predetermined acceptable value (S11). If the error is not within the acceptable value, either steps S6-S9 are repeated to move the control points to improve the degree of approximation or steps S13-S15 are performed to insert knots to increase the number of control points.

The division of the mesh in steps S13-S15 is performed if the error does not fall within the acceptable value even after steps S6-S9 are repeated the specified number of times (S12).

In S12, if the error does not fall within the acceptable value even after steps S6-S9 are repeated the specified number of times, the part of the control mesh $M_n$ where the error does not fall within the acceptable value is divided (FIG. 1(i)) (S13) to obtain the approximated surface $S_m$ using the control mesh $M_m$ obtained by the division (FIG. 1(j)) (S14). The subscript "m" of the control mesh $M_m$ indicates that the mesh configuration differs from that of the control mesh $M_n$, and that approximated surface $S_m$ indicates the approximated surface formed using the control mesh $M_m$.

The closest point $S(t_i)$ is obtained for the obtained approximated surface $S_m$ (FIG. 1(k)) (S15), and control is passed back to S6 to calculate the motion vector d of the control mesh $M_m$.

The approximated surface $S^\infty$, obtained when the distance error converges within the acceptable range as the result of the approximation processing, becomes the approximated surface that approximates the data points $p_i$ of the point group p.

The steps of the present invention are performed by the operation of geometrical algorithm. For example, the initial closest point $S^{(0)}(t_i)$ or the closest point $S^{(k)}(t_i)$ closest to the data point $p_i$ on the initial approximated surface $S^{(0)}$ or the approximated surface $S^{(k)}$ is calculated by the Newton method respectively in step S5 or S9, the error vector $e_i$ between the data point $p_i$ and the closest point $S^{(k)}(t_i)$ is obtained in step S7 and, using this error vector $e_i$, the control vector d for moving the control point $P^{(k)}$ is obtained. The obtained control vector d is used to move the control point $P^{(k)}$, and the moved control point $P^{(k+1)}$ is used to obtain the approximated surface $S^{(k+1)}$ in step S8.

The Loop subdivision with a triangular mesh and the Catmull-Clark subdivision and the Doo-Sabin subdivision with a square mesh may be used for subdividing a surface as well as for a B-Spline surface. The Chaikin subdivision may be used for subdividing a curve as well as an n-degree B-Spline curve. Note that the Chaikin subdivision converges to a two-degree B-Spline curve.

The approximation processing of the present invention has the following advantages in the calculation cost and in the generality of operation. The approximation processing of the present invention corrects the positions of control points by the geometrical algorithm with no need for solving a linear system, thus increasing the operation speed of the processing.

In addition, the approximation algorithm of the present invention generates a surface by means of a simple geometrical process. Because of this simple geometrical process, the present invention may be applied not only to a subdivision surface but also to a control-point defined curve or surface such as a B-Spline surface or curve, thus providing generality in surface generation.

FIG. 3 is a diagram showing an example of the configuration in which a program, which stores the approximation processing software of the present invention, is executed on a computer.

Input means 1 receives the data points pi of a point group p and stores the received data points in a data storage unit 2a of storage means 2. In addition to the data storage unit 2a, the storage means 2 comprises an operation tool program storage unit 2b that stores the operation tool program that performs the geometrical processing operation, an operation processing program storage unit 2c that stores operation processing programs for the approximation processing as well as the subdivision processing, a temporary storage unit 2d that temporarily stores an intermediate operation result and so on, and an operation result storage unit 2e that stores the operation result of a surface obtained by the approximation processing.

The data storage unit 2a may store not only the data points $p_i$ of the point group p but also a triangular mesh formed by the data points pi of the point group p or the initial control mesh $M^{(0)}_n$ generated from the mesh by QEM.

Operation means 3 performs operation processing either according to the operation procedure defined by the program stored in the operation processing program storage unit 2c or by sequentially reading the operation tool programs, specified by the program, from the operation tool program storage unit 2b.

The operations performed by the operation means 3 are as follows: the operation processing for forming a triangular mesh from the data points $p_i$ of the point group p stored in the data storage unit 2a, the operation processing for obtaining the initial control points $P^{(0)}$ from the mesh to generate the initial control mesh $M^{(0)}_n$, the operation processing for generating the initial approximated surface $S^{(0)}$ using the initial control mesh $M^{(0)}_n$, the operation processing for generating the approximated surface $S^{(k)}_n$ using the control mesh $M_n$, the operation processing for calculating the initial closest point $S^{(0)}(t_i)$ closest to the data point $p_i$ on the initial approximated surface $S^{(0)}$ by the Newton method, the operation processing for calculating the closest point $S^{(k)}(t_i)$ closest to the data point $p_i$ on the approximated surface $S^{(k)}_n$ by the Newton method, the operation processing for obtaining the error vector $e_i$ between the data point $p_i$ and the initial closest point) $S^{(0)}(t_i)$ and the error vector $e_i$ between the data point $p_i$ and the closest point $S^{(k)}(t_i)$ and for performing the vector operation for calculating the control vector d used to move the control point $P^{(k)}$ using the obtained error vector $e_i$, and the operation processing for moving the control point P by the control vector d.

The operation result stored in the operation result storage unit 2e may be read for display on display means 4 or for output on output means 5. The output means 5 may be an external device such as a recording device that records the operation result on a recording medium and a processing device that performs a predetermined operation using the operation result.

The configuration for performing the software processing described above may be applied to a dedicated software processing device or to a standard personal computer.

The function performed by the operation means, including the storage means, in the configuration described above may be configured by the circuits for execution on hardware.

Next, the following describes in detail the approximation processing of the present invention, in which an approximated surface is generated from a three-dimensional point group, with reference to the flowchart in FIG. 2 and the diagrams in FIG. 4 to FIG. 13. Note that the flow shown below is exemplary only and that the processing may be configured by another flow as long as the steps and procedure for performing the approximation processing of the present invention may be performed according to the flow.

In the flow of the approximation algorithm, the initial control mesh, which retains the features of the shape, is generated by QEM from the triangular mesh of the given point group and, from this initial control mesh, the initial approximated surface is generated. Next, the closest point on the approximated surface, generated from the control mesh (the initial control mesh in the first generation, and the control mesh created by moving the control points in the second and subsequent generations), from each data point is obtained, the error vector from this data point to the closest point is obtained, and the control point is moved using the error vector to generate a new approximated surface. Repeating the step of moving a control point and the step of generating an approximated surface using the moved control point allows an approximated surface, more approximated to the original shape, to be obtained.

The following describes the approximation processing by the geometrical algorithm with reference to FIG. 4 to FIG. 13. The data points $p_i$ of the point group p are obtained by a 3D measuring apparatus, and the data points $p_i$ are joined to create a mesh of triangular mesh. FIGS. 4(a) and 4(b) schematically show the data points $p_i$ of the point group p and a triangular mesh formed by the mesh formation processing.

In addition to the data points $p_i$ of the point group p, a triangular mesh, created in advance from the data points $p_i$, may be stored in the storage means for reading them later from the storage means. The 3D control mesh may be a triangular mesh or a square mesh. The Loop subdivision (Non-Patent Document 4) is known as the triangular mesh subdivision method, and the Catmull-Clark subdivision (Non-Patent Document 5) and the Doo-Sabin subdivision (Non-Patent Document 6) are known as the square mesh subdivision method.

The initial control mesh $M^{(0)}_n$, composed of the initial control points $P^{(0)}$, is generated from the triangular mesh by a processing method such as the well-known QEM (Surface simplification using quadric error metrics: Non-Patent Document 3), and the control points $P^{(0)}$ of the initial control mesh $M^{(0)}_n$ are stored in the data storage unit 2a. The initial approximated surface $S^{(0)}$ is generated using the stored initial control points $P^{(0)}$. The initial approximated surface, generated from the initial control mesh $M^{(0)}_n$, is represented by the approximated surface $S^{(0)}$. Thereafter, the approximated surface, generated in the k-th time generation from the control mesh $M_n$ that is generated by moving the control points, is represented by the approximated surface $S^{(k)}_n$.

Figure 4A:
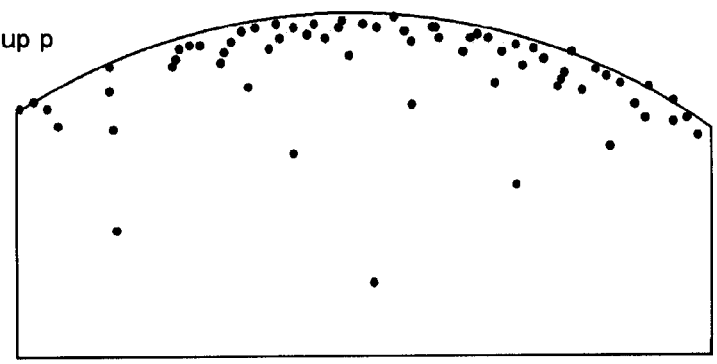
FIG. 4 is a general diagram showing the steps for performing the approximation processing of the present invention.
Figure 4B:
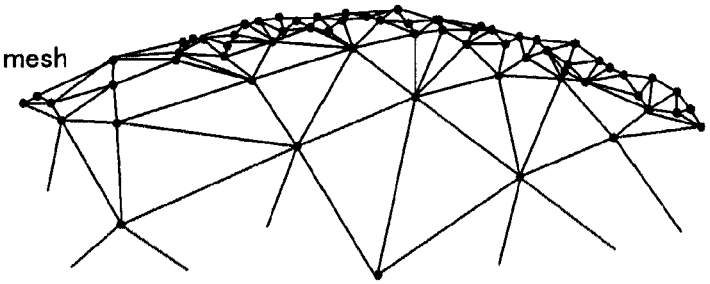
Figure 4C:
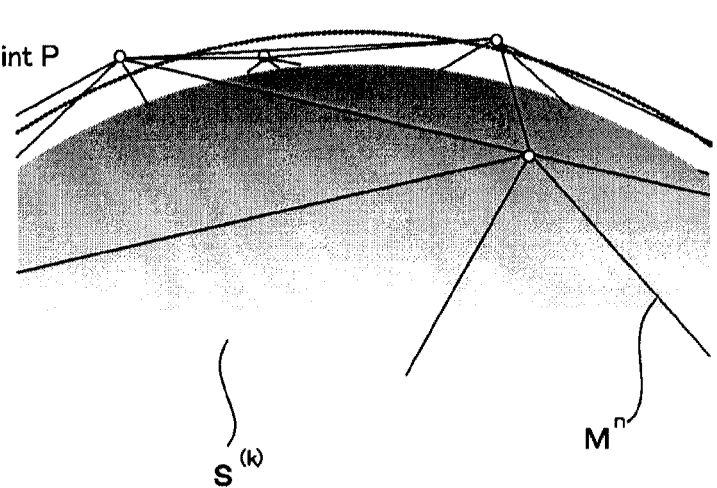

FIG. 4(a) shows the data points $p_i$ of the point group p, and FIG. 4(b) shows the data points $p_i$ of the point group p and the control mesh $M_n$ generated from the data points $p_i$. FIG. 4(c) shows the control mesh $M_n$ generated from the data points $p_i$ of the point group p and the approximated surface $S^{(k)}_n$ generated from the control mesh $M_n$. In this figure, the solid line indicates the control mesh $M_n$, and the white circle "o" indicates the control point P of the control mesh $M_n$. The broken line indicates the surface of the approximation object, and the data point $p_i$ (not shown in FIG. 4(c)) is a point on the surface of the approximation object. FIG. 4(c) shows the state in which there is an error between the approximated surface $S^{(k)}$ and the surface to be approximated.

Figure 5A:
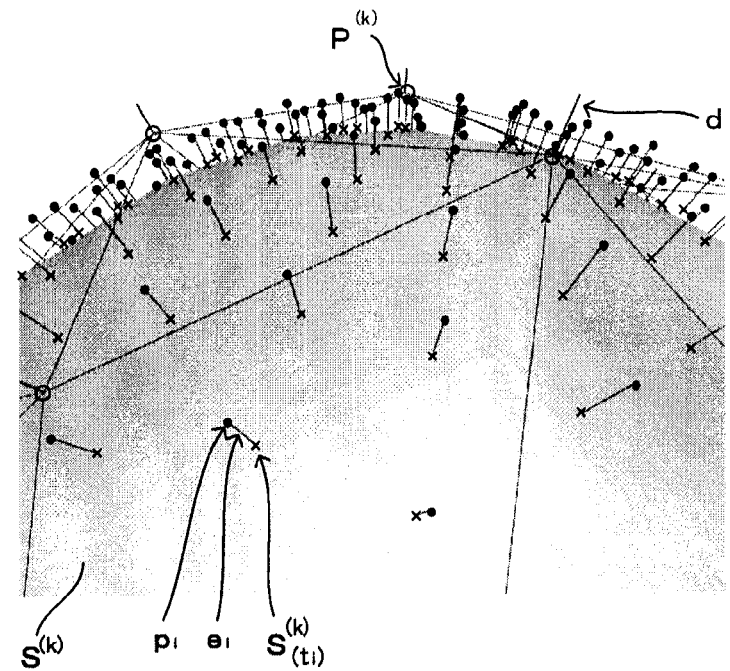
FIG. 5 is a general diagram showing the steps for performing the approximation processing of the present invention.
Figure 5B:
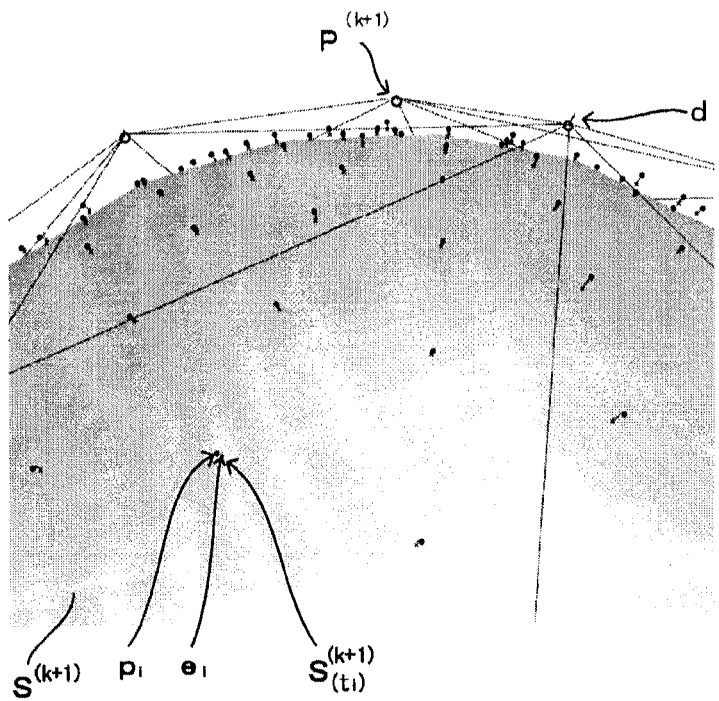

FIGS. 5(a) and 5(b) show the state in which the approximated surface $S^{(k)}$ is in the process of approximation to the surface of the approximation object. The data point $p_i$ is indicated by the solid circle "●" in FIG. 5. The approximated surface $S^{(k)}$ is formed by the control points P so that the approximated surface approximates the surface of the approximation object.

The approximated surface $S^{k+1}$ is obtained by moving the control points P. The repeated movement of the control points P reduces the error between the approximated surface $S^{(k+1)}$ and the surface of the approximation object with the result that the approximated surface successively approximates the surface of the approximation object. The control point P is moved based on the error vector $e_i$ between the data point $p_i$ and the closest point $S^{(k)}(t_i)$ closest to the data point $p_i$ on the approximated surface $S^{(k)}$.

FIG. 5 shows the relation between a data point $p_i$ and the closest point $S^{(k)}(t_i)$ closest to the data point $p_i$ on the approximated surface $S^{(k)}$. In FIG. 5(a), the closest point $S^{(k)}(t_i)$, indicated by x in the figure, is the point that is on the approximated surface $S^{(k)}$ and that is closest to the data point $p_i$. In FIG. 5(b), the closest point $S^{(k+1)}(t_i)$, indicated by x in the figure, is the point that is on the approximated surface $S^{(k+1)}$ and that is closest to the data point $p_i$.

FIG. 5(a) shows the control point $P^{(k)}$ before the movement and the approximated surface $S^{(k)}$ obtained by this control point $P^{(k)}$, and FIG. 5(b) shows the control point $P^{k+1}$ after the movement and the approximated surface $S^{(k+1)}$ obtained by this control point $P^{(k+1)}$. The approximated surface $S^{(k+1)}$ formed by moving the control points, gradually approximates to the surface of the approximation object.

Figure 6:
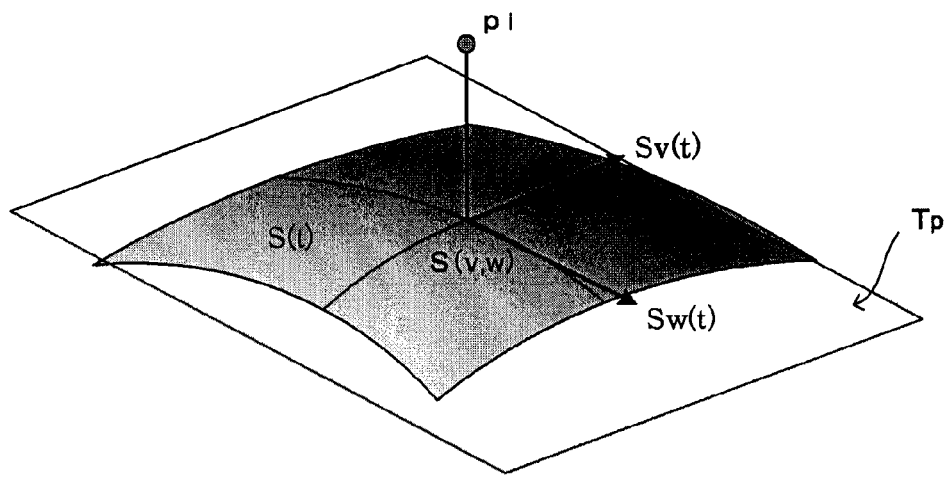
FIG. 6 is a diagram showing a closest point $S^{(k)}(t_i)$ on an approximated surface $S^{(k)}$.

FIG. 6 is a diagram showing the closest point $S^{(k)}(t_i)$ on the approximated surface $S^{(k)}$. In FIG. 6, $T_p$ indicates a tangent plane, $p_i$ indicates a data point, S(v,w) indicates a point on the approximated surface specified by the parameter (v,w), and i indicates the data point number.

The perpendicular from one data point to the approximated surface is given by the following expressions.

$$[(p-S(v,w))\cdot v(v,w)]=0$$

$$[(p-S(v,w))\cdot Sw(v,w)]=0 \quad (1)$$

where v and w are surface parameters, and Sv and Sw indicate the differentiation in the direction of V and w on the subdivision surface S.

According to Marinov and Kobbelt (Non-Patent Document 8), the point that is on the subdivision surface S formed by the control points and that has the shortest distance from each data point $p_i$ is calculated by solving the following expressions of the surface parameters ($\Delta v$, $\Delta w$) for finding the perpendicular from p to the tangent plane Tp.

$$[p-(S(v,w)+Sv(v,w)\Delta v+Sw(v,w)\Delta w)]\cdot Sv(v,w)]_{i,j}=0$$

$$[p-(S(v,w)+Sv(v,w)\Delta v+Sw(v,w)\Delta w)]\cdot Sw(v,w)]_{i,j}0 \quad (2)$$

where i is the data point number, j is the number of repetitions of the Newton method for parameterization, and ($\Delta v$, $\Delta w$) is the update parameter for the surface.

The error between the data point $p_i$ and the closest point $S^{(k)}(t_i)$ is represented by a vector. In the description below, the error is represented by the error vector $e_i$ from the data point $p_i$ to the closest point $S^{(k)}(t_i)$. In FIG. 5, the error vector $e_i$ is indicated by the straight line joining the data point $p_i$ and the closest point $S^{(k)}(t_i)$ or $S^{(k+1)}(t_i)$.

In the present invention, the error vector $e_i$ between the data point $p_i$ and the closest point $S^{(k)}(t_i)$ is obtained for the data point $p_i$ present around the control point P (if multiple error vectors $e_i$ are present, those multiple error vectors $e_i$ are added up) to obtain the motion vector d, which is used to move the control point P for generating a new control point $P^{(k+1)}$. FIG. 5 shows how the control point is moved. FIG. 5(a) shows the control point $P^{(k)}$ before the movement and the approximated surface $S^{(k)}$ formed by this control point $P^{(k)}$, and FIG. 5(b) shows the control point $P^{(k+1)}$ after the movement and the approximated surface $S^{(k+1)}$ formed by this control point $P^{(k+1)}$.

When moving the control point $P^{(k)}$ using the error vector $e_i$, each error vector $e_i$ obtained from each data point $p_i$ and the closest point $S^{(k)}(t_i)$ is weighted, and the weighted error vectors $e_i$ are added through vector addition to generate the motion vector d. If only one data point $p_i$ is present around the control point $P^{(k)}$, the closest point $S^{(k)}(t_i)$ corresponding to this one data point $p_i$ is obtained and the error vector $e_i$, generated by weighting the error vector $e_i$ between the data point $p_i$ and the closest point $S^{(k)}(t_i)$, is used as the motion vector d.

The error vector $e_i$ to be weighted is present around the control point P. The part around the control point P is, for example, a part within the approximated surface generated by the mesh that have the control point $P^{(k)}$ as the common vertex. Those mesh form one loop with the control point $P^{(k)}$ as the center. Because the mesh around the control point $P^{(k)}$ differ according to each control point and because the error vectors $e_i$ corresponding to each mesh differ according to each mesh, the number of error vectors $e_i$ to be weighted is not fixed. However, the data points $p_i$ and the closest points $S^{(k)}(t_i)$ forming the error vectors $e_i$ are determined by the number of data points of the point group and so the number of error vectors $e_i$ used for all control points P is fixed.

The degree of weighting may be determined according to the distance between the control point P and the closest point $S^{(k)}(t_i)$. The degree of weighting is set high for the error vector $e_i$ for the data point $p_i$ close to the control point $P^{(k)}$, while the degree of weighting is set low for the error vector $e_i$ for the data point $p_i$ far from the control point P. Weighting in this way reduces the number of repetitions for obtaining the approximated surface S.

Figure 7:
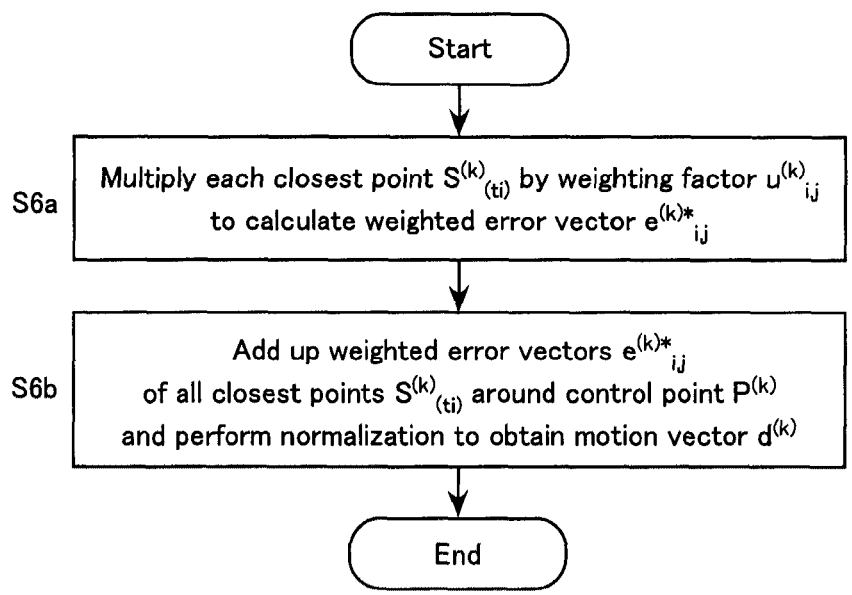
FIG. 7 is a flowchart showing the steps for performing the approximation processing of the present invention.
Figure 8:
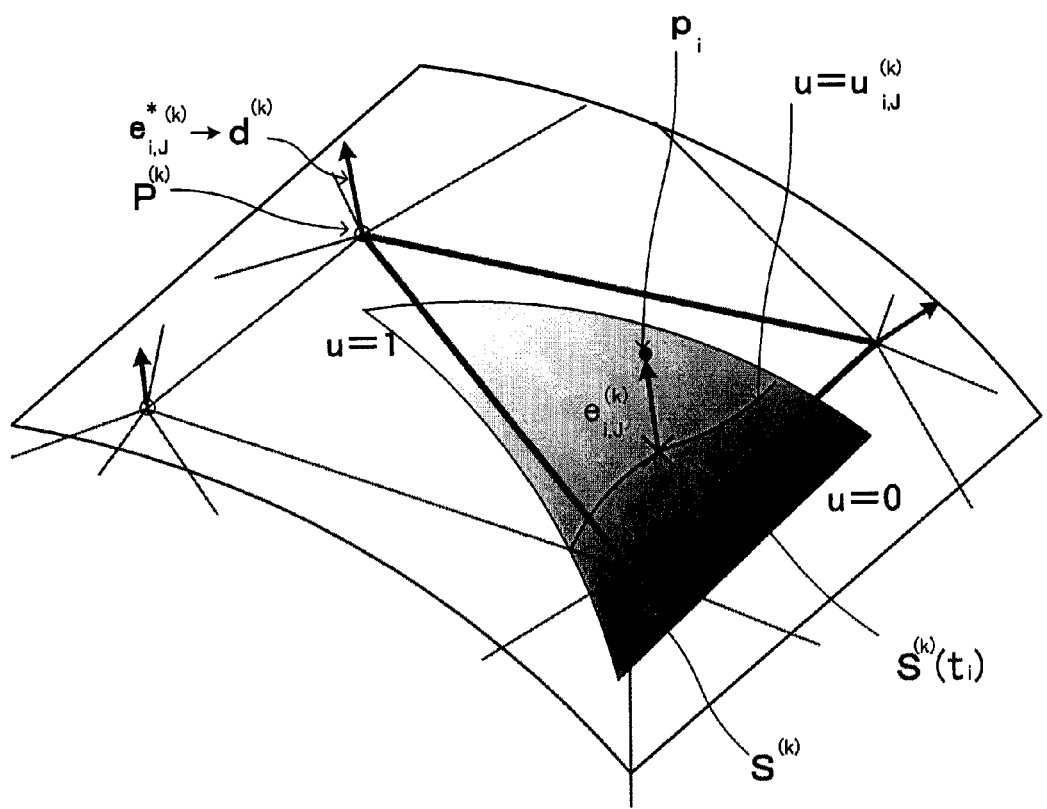
FIG. 8 is a diagram showing weighting on an error vector $e^{(k)}_i$.

The following describes the weighting of an error vector $e_i$ with reference to the flowchart in FIG. 7 and the drawing in FIG. 8. FIG. 8 shows one triangular mesh (triangle formed by the solid lines in FIG. 8) of the multiple triangular mesh formed around the control point $P^{(k)}$. In FIG. 8, the triangular mesh is indicated by the bold lines, and the approximated surface S corresponding to this triangular mesh is indicated by shading.

In FIG. 8, the data point $p_i$ indicated by the black circle "●" is a point on the surface of the approximation object, the closest point $S^{(k)}(t_i)$ indicated by the symbol x is a point closest to the data point $p_i$, and the arrow between the data point $p_i$ and the closest point $S^{(k)}(t_i)$ indicates the error vector $e^{(k)}_{i,J}$. In FIG. 8, only one set of the data point $p_i$, closest point $S^{(k)}(t_i)$, and error vector $e^{(k)}_{i,J}$ is shown in the triangular mesh and the approximated surface S. "J" indicates the J-th closest point $S^{(k)}(t_i)$ around the control point P.

The control point $P^{(k)}$ is moved by weighting the error vector $e^{(k)}_{i,J}$ around the control point $P^{(k)}$ and by using the added error vector $\Sigma e^{*(k)}_{i,J}$ calculated through the vector addition of the weighted error vectors $e^{*(k)}_{i,J}$. The symbol "*" indicates that the error vector is weighted.

The error vector $e^{(k)}_{i,J}$ is weighted according to the distance between the closest point $S^{(k)}(t_i)$ and the control point $P^{(k)}$. The weighting processing is performed by multiplying the error vector $e^{(k)}_{i,J}$ by the weighting factor $u^{(k)}_{i,J}$.

In the weighting processing, the error vector $e^{(k)}_{i,J}$ close to the control point P is multiplied by a larger weighting factor $u^{(k)}_{i,J}$, and the error vector $e^{(k)}_{i,J}$ far from the control point P is multiplied by a smaller weighting factor $u^{(k)}_{i,J}$. Here, the barycentric coordinate represented by $u^{(k)}_{i,J}=1.0-v^{(k)}_{i,J}-w^{(k)}_{i,J}$ may be used for the weighting factor $u^{(k)}_{i,J}$. The weighting factor $u^{(k)}_{i,J}$ represented by the barycentric coordinate is represented by the curve on the approximated surface $S^{(k)}$ in FIG. 8.

Using the weighting factor $u^{(k)}_{i,J}$, the weighted error vector $e^{*(k)}_{i,J}$ is represented as follows.

$$e^{*(k)}_{i,J}=u^{(k)}_{i,J}e^{(k)}_{i,J} \quad (3)$$

J=1, . . . , m where, m is the number of multiple closest points $S^{*(k)}(t_i)$ on the approximated surface S that are formed around the control point $P^{(k)}$ with the control point as the common vertex. The weighting factor $u^{(k)}_{i,J}$ at the control point $P^{*(k)}$ is "1", and the weighting factor $u^{(k)}_{i,J}$ at the edge of the approximated surface S far from the control point $P^{*(k)}$ is "0" (S6a).

Next, for all closest points $S^{(k)}(t_i)$ around the control point $P^{(k)}$, the weighted error vectors $e^{*(k)}_{i,J}$ are added up and normalization is performed to calculate the motion vector d (S6b).

Figure 9:
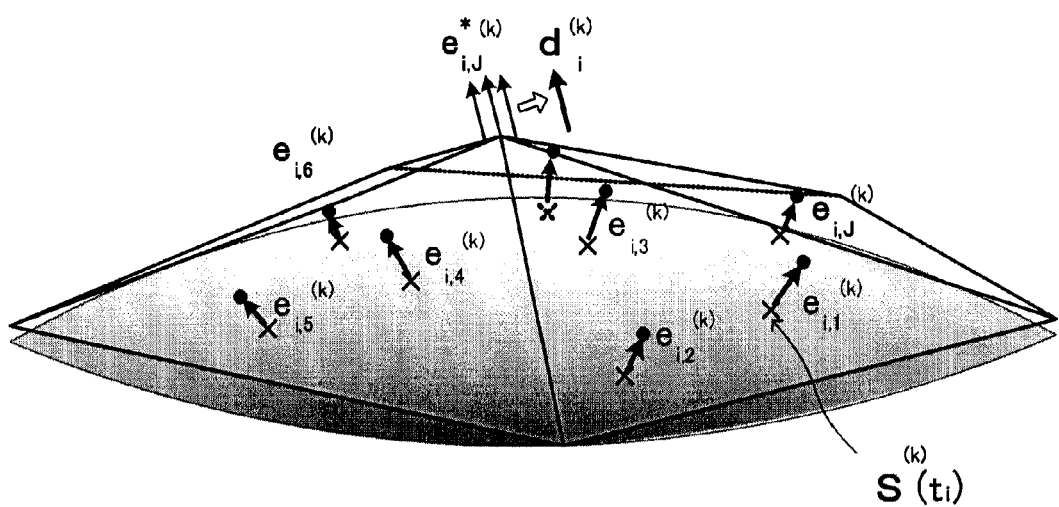
FIG. 9 is a diagram showing the error vectors $e^{(k)}_{i,j}$ around a control point.

FIG. 9 is a diagram showing the error vectors $e^{(k)}_{i,J}$ around a control point.

For the approximated surface $S^{(k)}$ formed by each triangular mesh, the weighted error vector $e^{(k)}_{i,J}$ is calculated for each closest point $S^{(k)}(t_i)$ by weighting the error vector $e^{(k)}_{i,J}$ from the data point $p_i$ to the closest point $S^{(k)}(t_i)$.

For one control point $P^{(k)}$, there are multiple triangular mesh with the control point $P^{(k)}$ as the common vertex, and the weighted error vector $e^{*(k)}_{i,J}$ is generated for the closest point $S^{(k)}(t_i)$ on the approximated surface $S^{(k)}$ formed by each triangular mesh. Therefore, multiple weighted error vectors $e^{*(k)}_{i,J}$ are generated for one control point $P^{(k)}$. Those weighted error vectors $e^{*(k)}_{i,J}$ are added up at the control point $P^{(k)}$ to generate a motion vector $d^{(k)}$ used to move the control point.

The control motion vector $d^{(k)}$ used to move the control point $P^{(k)}$ is represented as follows.

$$d^{(k)}=\Sigma_J e^{*(k)}_{i,J}/\Sigma u^{(k)}_{i,J} \quad (4)$$

$\Sigma u^{(k)}_{i,J}$ is the value generated by adding up the weighting factors $u^{(k)}_{i,J}$, and the added value $(\Sigma_J e^{*(k)}_{i,J})$ of the error vectors $e^{*(k)}_{i,J}$ is divided by this added value for normalization.

This motion vector $d^{(k)}$ is used to move the control point $P^{(k)}$ to generate a new control point $P^{(k+1)}$. Based on the new control point $P^{(k+1)}$ obtained in this way, the approximated surface $S^{(k+1)}$ is generated.

The following describes how to evaluate the approximation degree of the approximation processing using the error function E. The evaluation function E calculates the absolute value error between the data point $p_i$ and the closest point $S^{(k)}(t_i)$. As the evaluation function E, the average error Eave and the maximum error Emax may be defined.

The average error Eave and the maximum error Emax are defined as follows.

$$\text{Average error } E\text{ave}=\Sigma_{i=1}^{n}\|p_i-S^{(k)}(t_i)\|_2/n \quad (5)$$

$$\text{Maximum error } E\text{max}=\max_{1\leq i\leq n}\|p_i-S^{(k)}(t_i)\|_2 \quad (6)$$

$\|p_i-S^{(k)}(t_i)\|_2$ indicates the mean square of $p_i-S^{(k)}(t_i)$.

In the comparison between the error E and the acceptable value in S10 in the flowchart shown in FIG. 2, each of the calculated average error Eave and the maximum error Emax is compared with the predetermined acceptable value, and steps S6-S9 are repeated until the average error Eave and the maximum error Emax fall within the acceptable range.

If the error Eave and the maximum error Emax do not converge within the acceptable range even after the control point is moved in steps S6-S9 the predetermined number of times (S12), the mesh is further divided to increase the number of control points P (S13), the approximated surface $S_m$ and the closest point $S^{(k)}(t_i)$ are obtained (S14, S15), and steps S6-S9 are repeated again until the average error Eave and the maximum error Emax fall within the acceptable range.

Figure 10A:
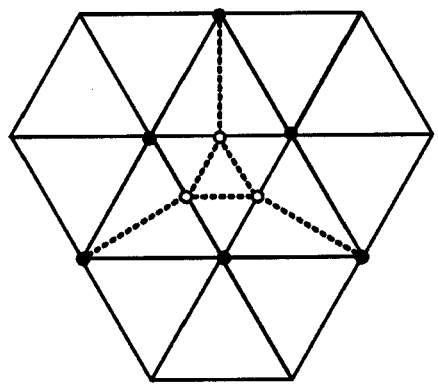
FIG. 10 is a diagram showing an increase in the number of control points P.
Figure 10B:
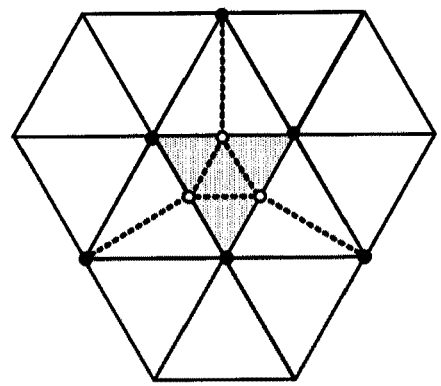
Figure 10C:
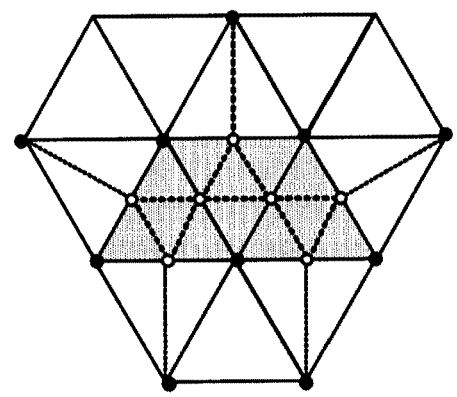

FIG. 10 is a diagram showing how the number of control points P is increased by dividing a mesh. FIG. 10(a) shows an example of a mesh composed of 13 triangular mesh.

In one example, a new control point (indicated by white circle "○" in the figure) is added to the midpoint between each two of the three control points in the triangular mesh in the center to divide one triangular mesh into four triangular mesh. In addition, for maintaining compatibility, each of the added control points is joined to the control point of its outer triangular mesh to divide each of the outer three triangular mesh into two triangular mesh.

In another example, a new control point (indicated by white circle "○" in the figure) is added to the midpoint between each two of the three control points of each of the triangular mesh in the three triangular mesh, arranged in the center, to divide one triangular mesh of each of the triangular faces into four triangular mesh. In addition, for maintaining compatibility, each of the added control points is joined to the control point of its outer triangular mesh to divide each of the outer five triangular mesh into two triangular mesh.

In addition to increasing the number of control points, the degree of approximation may be increased by local re-meshing. FIG. 11 and FIG. 12 are diagrams showing examples of local re-meshing.

FIG. 12 is a diagram showing an example of removing a long mesh by adjusting the control point. The control point connection state shown in FIG. 12(a) is changed to the control point connection state shown in FIG. 12(b) to increase the angle of a triangular mesh and, thereby, to remove the long mesh.

Figure 13:
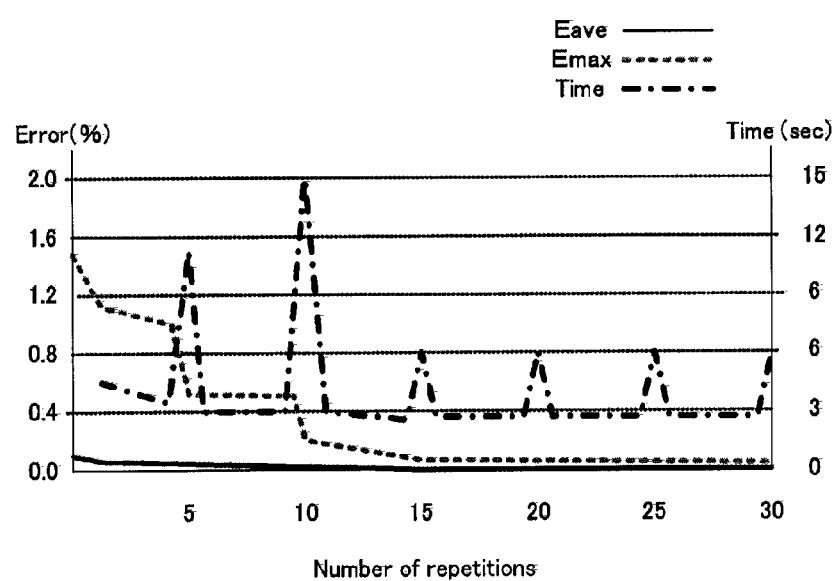
FIG. 13 is a diagram showing an example of the result of the present invention.
Figure 14A:
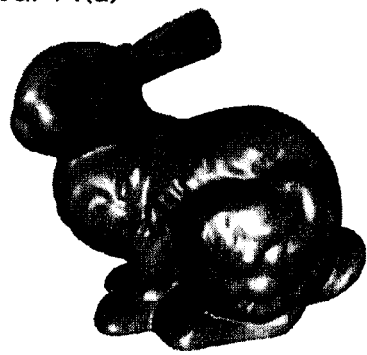
FIG. 14 is a diagram showing an example of the approximation of the present invention.
Figure 14B:
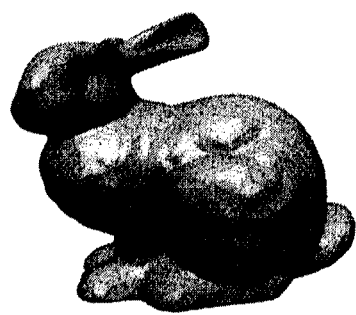
Figure 14C:
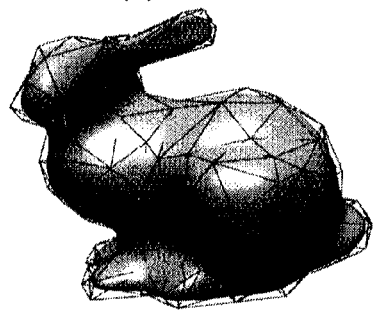
Figure 14D:
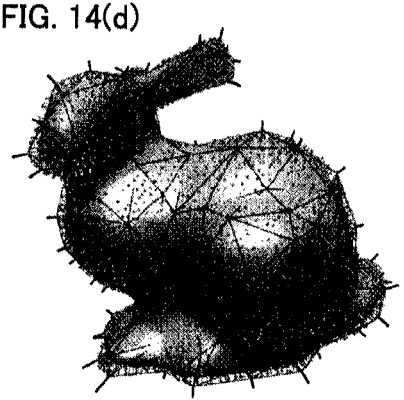
Figure 14E:
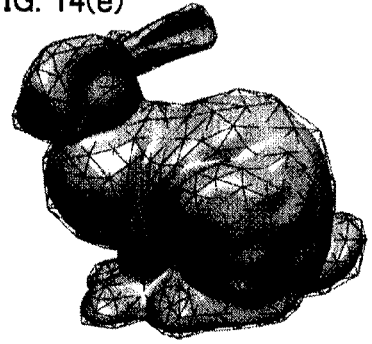

The following shows an example of the operation result of the present invention with reference to FIG. 13. FIG. 13 is a diagram showing the changes in the error and the calculation time when the operation is repeated.

The average error Eave reaches 0.01% on the 16th repetition, and the maximum error Emax reaches 0.05% on the 30th repetition. Note that the peak of the maximum error Emax occurs every five repetitions due to the adjustment of the control point.

Table 1 below shows an example of the errors and the calculation times of the models processed by the present invention and an example of those processed by the other methods. The other methods used in the comparison are [Marinov and Kobbelt 2005] (Non-Patent Document 8) and [Cheng etl 2007] (Non-Patent Document 9).

TABLE 1

| Model | original n | Initial n | Final n | Emax (%) | Erms (%) | Precomputation | Total time |
|---|---|---|---|---|---|---|---|
| Invention of this application | | | | | | | |
| Model A | 173K | 433 | 3267 | 0.248 | 0.0618 | 19 sec | 1 min:49 sec |
| Model B | 543K | 4091 | 26838 | 0.049 | 0.0101 | 1 min | 7 min:6 sec |
| Model C | 37K | 612 | 7049 | 0.049 | 0.0108 | 4 sec | 22 sec |
| Model D | 134K | 336 | 1572 | 0.238 | 0.0701 | 14 sec | 1 min:8 sec |
| Marinov and Kobbelt 2005 | | | | | | | |
| Model A | 173K | 433 | 2820 | 0.248 | 0.0598 | N/A | 12 min:26 sec |
| Model B | 543K | 4093 | 17995 | 0.049 | N/A | N/A | 64 min |
| Model C | 37K | 612 | 8440 | 0.048 | N/A | N/A | 5 min |
| Model D | 134K | 336 | 1553 | 0.247 | 0.0575 | N/A | 8 min:29 sec |
| Cheng et al. 2007 | | | | | | | |
| Model B | 543K | 4662 | 18715 | 0.43* | 0.03* | 83 min:58 sec | 114 min:6 sec |
| Model C | 35K | 919 | 996 | 0.82* | 0.09* | 6 min:1 sec | 7 min:18 sec |
| Model D | 134K | 526 | 2385 | 0.36* | 0.05* | 4 min:11 sec | 6 min:43 sec |

FIG. 11 is a diagram showing the topological adjustment of the control point P. It is known that the mesh quality is evaluated by the order d(v) of control points. The optimal order $d_{opt}(v)$ at the vertex of a boundary is 4, and the optimal order $d_{opt}(v)$ at the vertex of a non-boundary part is 6.

The following function is known as the evaluation function R(M) for evaluating the mesh quality.

$$R(M)=\Sigma(d(v)-d_{opt}(v))^2 \quad (7)$$

This function indicates that the lower the evaluation value is, the higher the mesh quality is. v is an element of M.

Figure 11A:
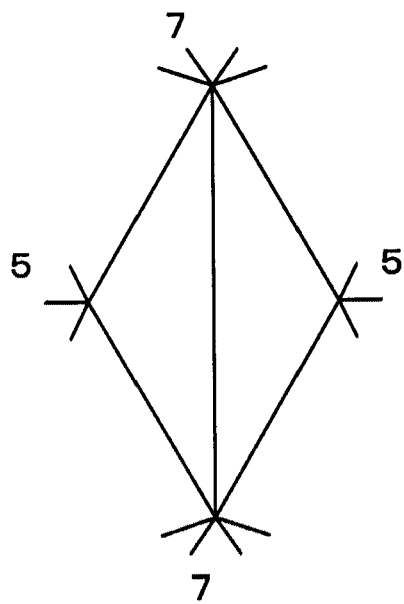
FIG. 11 is a diagram showing an example of local re-meshing.
Figure 11B:
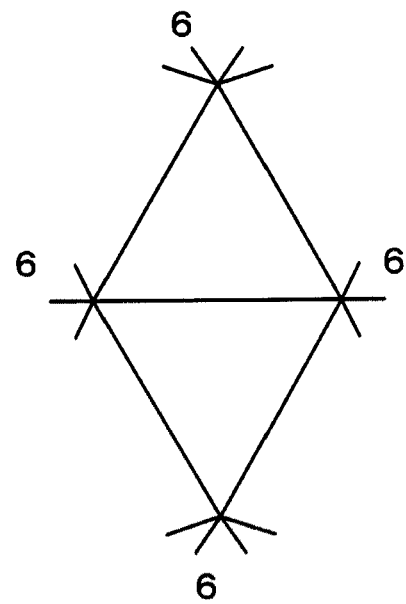

The comparison of the value of the evaluation function R(M) between the mesh shown in FIG. 11(a) and the mesh shown in FIG. 11(b) indicates that the value of the mesh evaluation function R(M) shown in FIG. 11(b) is lower than the value of the mesh evaluation function R(M) shown in FIG. 11(a). The result of this comparison, therefore, shows that changing the mesh connection state decreases the value of the evaluation function R(M), indicating that the mesh quality is increased.

A long mesh, which may generate an unwanted swell, should be removed if included.

The approximation processing of the present invention in Table 1 is performed assuming that the average error is 0.01% and the maximum error is 0.05% and using a 3.0 GHz Pentium (registered trademark) IV PC with 2 GB RAM.

The comparison between the approximation processing method of the present invention and the method of [Marinov and Kobbelt 2005] (non-Patent Document 8) leads to the evaluation that the method of the present invention is about six times higher in processing speed. The method of [Marinov and Kobbelt 2005] (non-Patent Document 8) is performed using a Pentium (registered trademark) 2.8 GHz PC with 2 GB RAM, and the means square error is used instead of the average error.

The comparison between the approximation processing method of the present invention and the method of [Cheng et al. 2007] (non-Patent Document 9) leads to the evaluation that the method of the present invention is about six times higher in processing speed. The method of [Cheng et al. 2007] (non-Patent Document 9) is performed using a Xeon 2.8 GHz PC with 2 GB RAM.

FIG. 14 is a diagram showing an example of the approximation processing of the present invention. FIG. 14(a) shows the image of the physical object of an approximation object, FIG. 14(b) is a diagram showing the image of the physical object with the data points overlapped thereon, FIG. 14(c) indicates a triangular mesh generated by QEM, FIG. 14(d) shows the error vectors and control vectors, and FIG. 14(e) shows the approximated surface obtained as the result of the approximation processing.

Although an example of the generation of a three-dimensional approximated surface is described above, the present invention may be applied also to the generation of a two-dimensional approximated curve.

The following describes an example of the generation of an approximated curve. In the description below, a B-spline curve that approximates the given point group of n+1 points is described.

First, the feature points S are selected from the point group of n+1 points while retaining the shape. To do so, the Douglas-Peucker Algorithm, a simplification method for an approximated curve, is used. The Douglas-Peucker Algorithm, a simplification method for an approximated curve, is widely used in computer graphics and geographic information systems. First, the simplification method starts by forming one edge joining the start point to the end point of an approximated curve and then the distance between the edge and each of the remaining vertexes is obtained. If there is a vertex whose distance from the edge is greater than the threshold, the approximated curve is divided at the furthest vertex and, for each of the divided approximated curves, the process of edge simplification is performed recursively.

The parameter values are assigned to the selected N+1 feature points S, and the knot vector is defined. The initial curve is generated with the knot vector T and the feature points S as the control points P. The curve approximation of the present invention is performed by the following two processes: error vector calculation and control point movement.

In the error vector calculation, a perpendicular is dropped from the input point group on the curve defined by the control points P, and the vector from the foot of the perpendicular to an input point when the perpendicular is dropped to the curved line is used as the error vector. The perpendicular, which corresponds to the closest point on the curve from the input point, is obtained by the Newton method.

In the control point movement, because the approximation method is different from the interpolation method in that the number of control points is smaller than the number of input points of the group, there is no one-to-one correspondence between the error vectors and the control points and so the error vectors do not match the movement vectors. Therefore, for each control point that affects the span on which the perpendiculars drop, the error vector is weighted for each input point based on the B-spline basis function. Each control point P is moved by the weighted motion vector to find a new control point P.

The curve approximation is performed by repeating these processes. A B-spline curve approximating the input point group is generated by repeating the above two processes until the distance satisfies the threshold for all points of the input group. For a part where the distance is large in the repetition process, a knot is inserted as necessary to perform the approximation while increasing flexibility in the curve.

In B-spline curve approximation, the error vector is weighted based on the B-spline basis function.

This weighting is performed with focus on the k control points configuring one span. For each control point that affects the span on which the perpendiculars drop, the motion vector is defined for each input point by weighting the error vector based on the B-spline basis function. By weighting the error vector using the B-spline basis function, the error vector may be weighted more heavily as it is closer to the control point.

Figure 15:
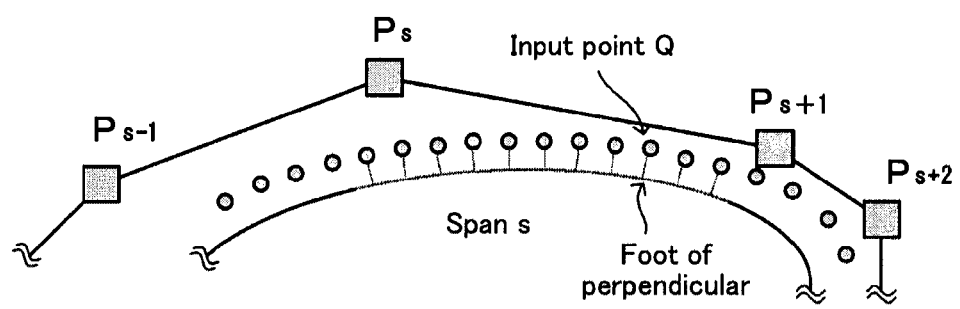
FIG. 15 is a diagram showing weighting performed in the approximation of a B-Spline curve of the present invention.

FIG. 15 is a diagram showing the weighting performed in B-spline curve approximation. In FIG. 15, the search is made for the span s where the perpendiculars drop from the input points Q on the curve.

The error vectors, which are weighted based on the B-spline basis function, are added up for each of k control points configuring the spans. In the example shown in FIG. 15, the error vectors are added up for each of the control points $P_{s-1}$, $P_s$, $P_{s+1}$, and $P_{s+2}$ configuring the span s.

The above processes are performed for all data points of the received point group, and the total vector is normalized to find the direction vector of the movement. The normalization is performed by dividing the magnitude of the weighted error vectors by the scalar quantity added up for each control point. The movement amount is obtained by calculating the average produced by dividing the total quantity (scalar amount described above) by the total number.

The invention as claimed in the application is applicable not only to the subdivision surface or B-spline described above but also to NURBS.

INDUSTRIAL APPLICABILITY

The present invention is applicable to reverse engineering in the 3D modeling field.

The invention claimed is:

1. An approximation processing method for approximating data points of a point group using a curve or a surface defined by control points, said approximation processing method, executed by a computer according to a program stored in the computer, comprising:
   a simplification step of forming an initial approximated curve or an initial approximated surface using initial control points that are simplified by a geometrical algorithm;
   a step of forming an approximated curve or an approximated surface using control points that retain features of a shape from the initial approximated curve or the initial approximated surface;
   a first calculation step of calculating a closest point closest to each of the data points on the approximated curve or the approximated surface;
   a second calculation step of calculating an error vector that joins the closest point, obtained in said first calculation step, to the data point; and
   a third calculation step of calculating a corrected control point by moving each of the control points based on the error vector obtained by said second calculation step wherein
   said step of forming an approximated curve or an approximated surface and said calculation steps are performed by operation means in which the geometrical algorithm is included,
   said step of forming an approximated curve or an approximated surface and said first to third calculation steps are repeated to make the approximated curve or the approximated surface respectively approximate the curve or the surface of an object configured by the data points, and
   said third calculation step performs weighting processing for error vectors that are a plurality of error vectors calculated by said second calculation step and that are calculated for closest points around a control point to be corrected, adds up the weighted error vectors through vector addition, moves the control point with the added vector, generated by adding up the vectors, as a motion vector, and calculates the moved control point as the corrected control point.

2. The approximation processing method according to claim 1 wherein
said first calculation step uses the Newton method to calculate the closest point closest to the data point on the approximated curve or the approximated surface.

3. The approximation processing method according to claim 2 wherein
the weighting processing performed by said third calculation step is operation processing in which each of the error vectors obtained for the closest point around the control point is multiplied by a factor and
the factor has a value according to a distance between the control point and the closest point in such a way that the closer the closest point is to the control point, the larger the value is.

4. The approximation processing method according to claim 2, further comprising the steps of:
calculating an approximation error of the approximated curve or the approximated surface based on a distance between the data point and the closest point on the approximated curve or the approximated surface corresponding to the data point and
repeating said first to third calculation steps until the approximation error becomes smaller than a predetermined value.

5. The approximation processing method according to claim 4, further comprising the steps of:
if the number of repetitions of the calculation processing of the control point exceeds a predetermined number of times, increasing the number of control points through face division; and
repeating the calculation step of the control point and the control point increase step through face division until the approximation error becomes smaller than a predetermined value.

6. The approximation processing method according to claim 2, further comprising:
a step of forming a broken line or a mesh by joining the data points of the point group; and
a step of finding vertexes, which constitute the feature of the broken line or the mesh, and using the vertexes as initial control points wherein
said step of forming an approximated curve or an approximated surface uses the initial control points to form a first approximated curve or approximated surface.

7. The approximation processing method according to claim 1 wherein
the weighting processing performed by said third calculation step is operation processing in which each of the error vectors obtained for the closest point around the control point is multiplied by a factor and
the factor has a value according to a distance between the control point and the closest point in such a way that the closer the closest point is to the control point, the larger the value is.

8. The approximation processing method according to claim 7, further comprising the steps of:
calculating an approximation error of the approximated curve or the approximated surface based on a distance between the data point and the closest point on the approximated curve or the approximated surface corresponding to the data point and
repeating said first to third calculation steps until the approximation error becomes smaller than a predetermined value.

9. The approximation processing method according to claim 8, further comprising the steps of:
if the number of repetitions of the calculation processing of the control point exceeds a predetermined number of times, increasing the number of control points through face division; and
repeating the calculation step of the control point and the control point increase step through face division until the approximation error becomes smaller than a predetermined value.

10. The approximation processing method according to claim 1, further comprising the steps of:
calculating an approximation error of the approximated curve or the approximated surface based on a distance between the data point and the closest point on the approximated curve or the approximated surface corresponding to the data point and
repeating said first to third calculation steps until the approximation error becomes smaller than a predetermined value.

11. The approximation processing method according to claim 10, further comprising the steps of:
if the number of repetitions of the calculation processing of the control point exceeds a predetermined number of times, increasing the number of control points through face division; and
repeating the calculation step of the control point and the control point increase step through face division until the approximation error becomes smaller than a predetermined value.

12. The approximation processing method according to claim 1, further comprising:
a step of forming a broken line or a mesh by joining the data points of the point group; and
a step of finding vertexes, which constitute the feature of the broken line or the mesh, and using the vertexes as initial control points wherein
said step of forming an approximated curve or an approximated surface uses the initial control points to form a first approximated curve or approximated surface.

13. An approximation processing device for approximating a point group using a curve or a surface defined by control points, said approximation processing device comprising:
operation means that performs:
a simplification step of forming an initial approximated curve or an initial approximated surface using initial control points that are simplified by a geometrical algorithm;
a step of forming an approximated curve or an approximated surface using control points that retain features of a shape from the initial approximated curve or the initial approximated surface;
a first calculation step of calculating a closest point closest to each of the data points on the approximated curve or the approximated surface;
a second calculation step of calculating an error vector that joins the closest point, obtained in said first calculation step, to the data point; and
a third calculation step of calculating a corrected control point by moving each of the control points based on the error vector obtained by said second calculation step wherein
said operation means comprises either a CPU and a storage device for executing the geometrical algorithm for performing said step of forming an approximated curve or an approximated surface and said calculation steps by software or a circuit for executing the geometrical algorithm by hardware and performs said step of forming an approximated curve or an approximated surface and said first to third calculation steps repeatedly to make the approximated curve or the approximated surface respectively approximate the curve or the surface of an object, and said third calculation step performs weighting processing for error vectors that are a plurality of error vectors calculated by said second calculation step and that are calculated for closest points around a control point to be corrected, adds up the weighted error vectors through vector addition, moves the control point with the added vector, generated by adding up the vectors, as a motion vector, and calculates the moved control point as the corrected control point.

* * * * *